(12) United States Patent
Fujiwara et al.

(10) Patent No.: US 8,103,101 B2
(45) Date of Patent: Jan. 24, 2012

(54) REGION EXTRACTION SYSTEM, REGION EXTRACTION METHOD AND PROGRAM

(75) Inventors: Koichi Fujiwara, Kobe (JP); Osamu Toyama, Kakogawa (JP); Shinichi Horita, Osaka (JP)

(73) Assignee: Konica Minolta Medical & Graphic, Inc., Shibuya-Ku, Tokyo (JP)

( * ) Notice: Subject to any disclaimer, the term of this patent is extended or adjusted under 35 U.S.C. 154(b) by 1237 days.

(21) Appl. No.: 11/471,778

(22) Filed: Jun. 21, 2006

(65) Prior Publication Data

US 2006/0291724 A1 Dec. 28, 2006

(30) Foreign Application Priority Data

Jun. 22, 2005 (JP) .................................. 2005-182230
Apr. 5, 2006 (JP) .................................. 2006-103877

(51) Int. Cl.
*G06K 9/46* (2006.01)
(52) U.S. Cl. ....................................................... 382/190
(58) Field of Classification Search ................... 382/190
See application file for complete search history.

(56) References Cited

U.S. PATENT DOCUMENTS 6,064,391 A * 5/2000 Sano et al. ..................... 345/424

OTHER PUBLICATIONS

Baigalmaa Tsagann et al, "Development of Extraction Method of Kidneys from Abdominal CT Images Using a Three Dimensional Deformable Model", Trans. of IEICE in Japan, D-II, vol. J85-D-II, No. 1, Jan. 2002, pp. 140-148.

* cited by examiner

*Primary Examiner* — Daniel Mariam
*Assistant Examiner* — Elisa Rice
(74) *Attorney, Agent, or Firm* — Buchanan Ingersoll & Rooney PC

(57) ABSTRACT

A region extraction system includes a temporary region extractor for temporarily extracting a to-be-extracted region from measured data with a region growing technique, an initial position determiner for determining an initial position of a standard model for the to-be-extracted region using the to-be-extracted region temporarily extracted, and a to-be-extracted region extractor for extracting the to-be-extracted region from the measured data with a model fitting technique using the standard model.

17 Claims, 17 Drawing Sheets

F I G . 4
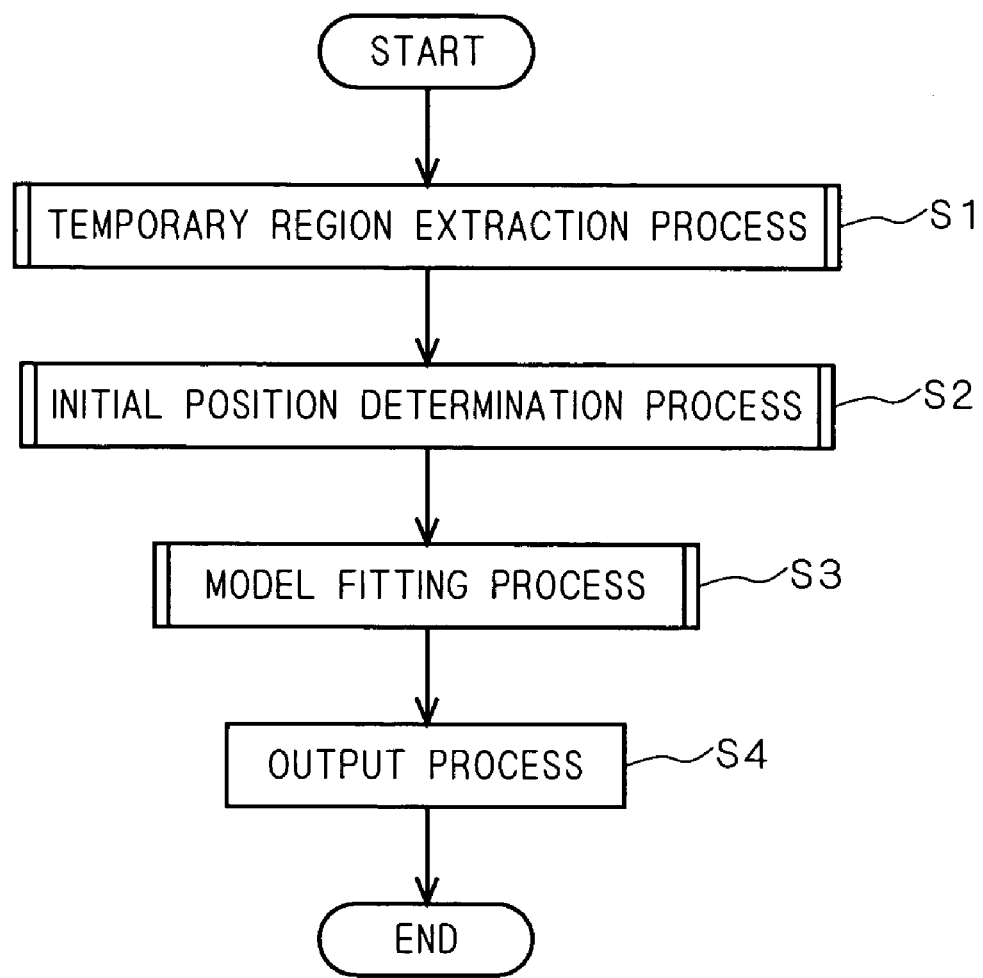

F I G . 6
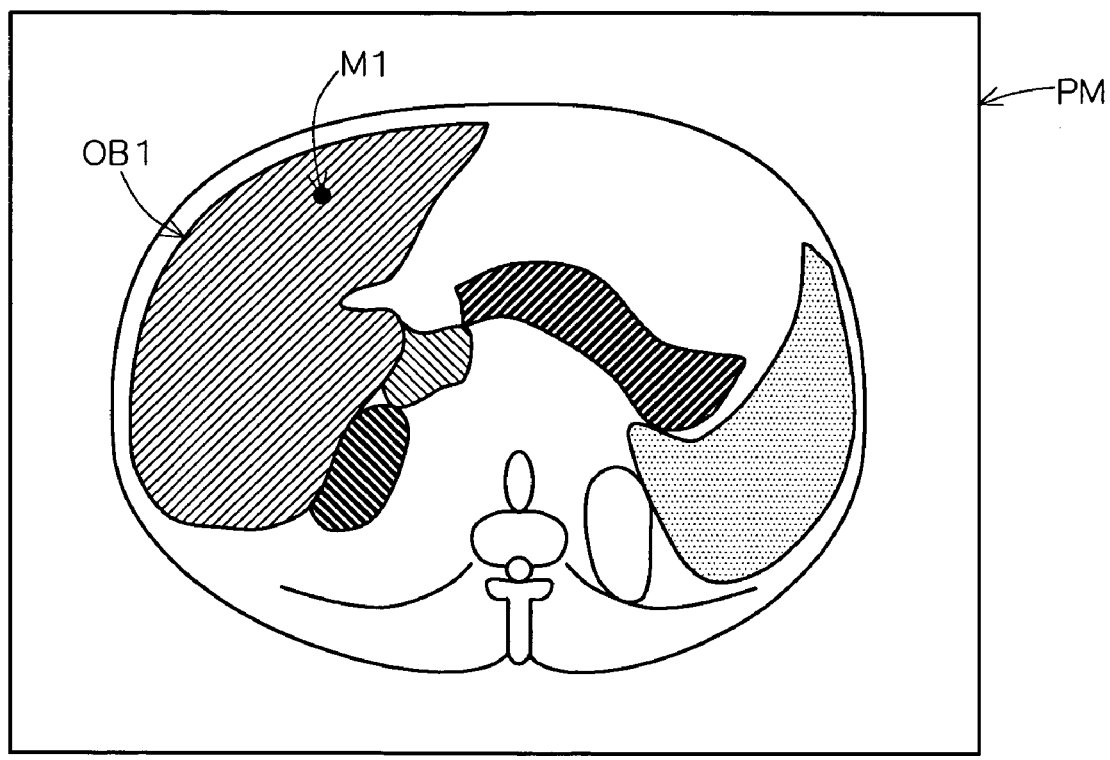

F I G . 2 0
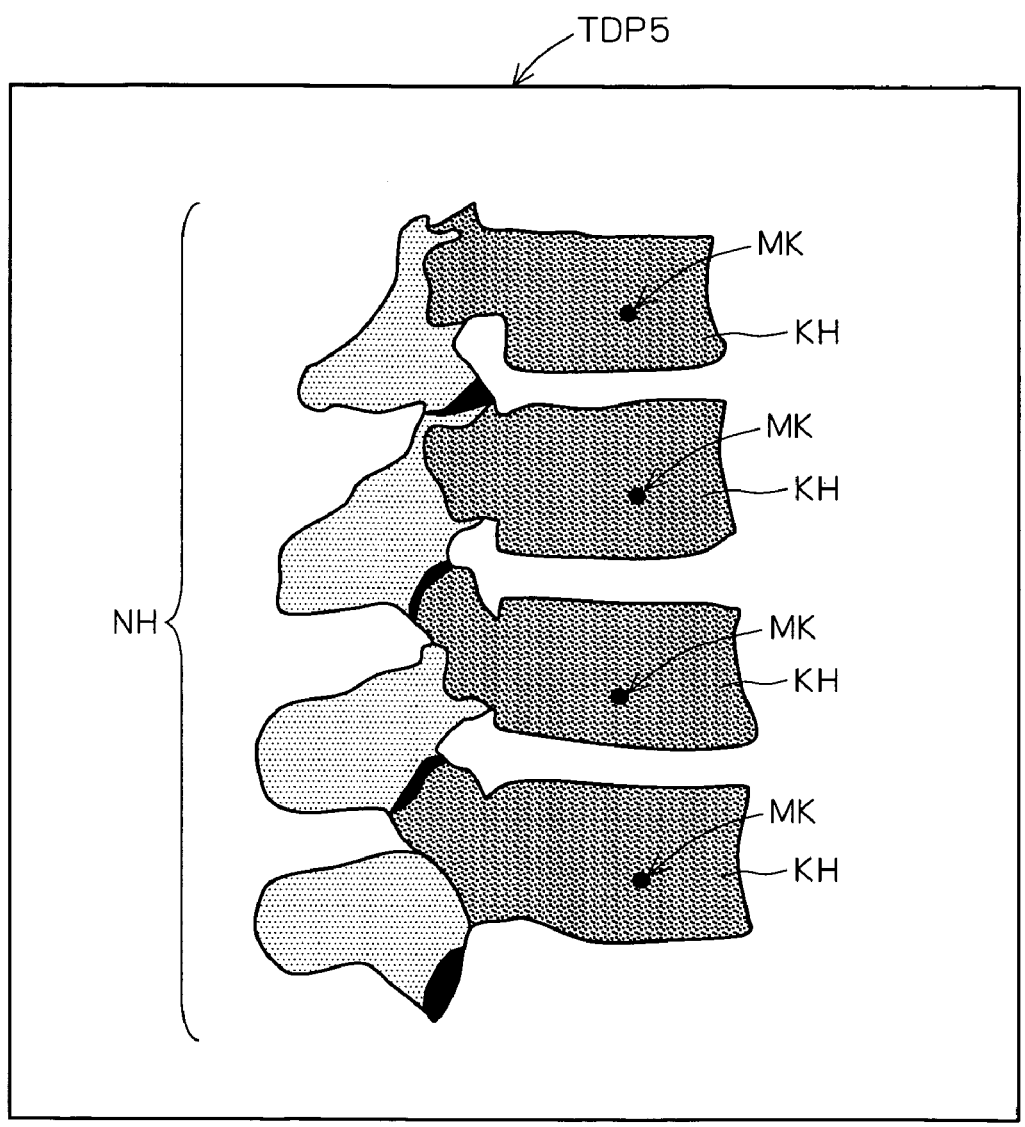

REGION EXTRACTION SYSTEM, REGION EXTRACTION METHOD AND PROGRAM

This application is based on application Nos. JP2005-182230 and JP2006-103877 filed in Japan, the contents of which are hereby incorporated by reference.

BACKGROUND OF THE INVENTION

1. Field of the Invention

The present invention relates to a region extraction technique for extracting a desired region from measured data.

2. Description of the Background Art

In recent years, a three-dimensional (3D) image (medical image) in a living body captured by an X-ray CT (Computed Tomography) system, an MRI (Magnetic Resonance Imaging) system or the like has been widely used in the medical field. Accordingly, information on organs and the like in the body can visually be identified, so that an improved diagnostic accuracy can be expected. On the other hand, however, a 3D image for use in diagnosis consists of several tens to several hundreds of slice images, which imposes a significant burden of acquiring only information necessary for diagnosis from such a huge amount of information on a diagnostician.

Therefore, with the growing demand for a computer-aided quantitative or automatic diagnosis, CAD (Computer-aided diagnosis) systems are under active study.

For conducting a computer-aided diagnosis, it is an important issue to precisely extract information necessary for diagnosis, that is, the region or shape, etc. of an organ.

As a technique for extracting an organ region, the model fitting technique of deforming a previously-prepared standard model on the basis of energy minimizing principles to find a target contour is proposed (Baigalmaa TSAGAAN, Akinobu SHIMIZU, Hidefumi KOBATAKE and Kunihisa MIYAKAWA: "Development of Extraction Method of Kidneys from Abdominal CT Images Using a Three Dimensional Deformable Model", Trans. of IEICE in Japan, January 2002, D-II, Vol. J85-D-II, No. 1, pp. 140-148).

This technique deforms a previously-characterized model called a standard model to extract the region of concern, which allows highly accurate extraction.

However, the quality of extraction results using that technique depends upon the initial position of the standard model prior to the fitting process, which raises a great issue of how to locate the standard model in a position suitable for model fitting. In the aforementioned paper, for extraction of the kidney region, the initial position of the standard model is determined using the position of gravity center of kidney registered in a database. Accordingly, there is a problem in that it is difficult to obtain good extraction results when the position of gravity center of kidney in measured data (3D image) is displaced from the position of gravity center registered in the database.

SUMMARY OF THE INVENTION

An object of the present invention is to provide a region extraction technique capable of determining with higher accuracy the initial position of a standard model in the model fitting technique.

To achieve the object, an aspect of the present invention is directed to a region extraction system comprising: a temporary region extractor for temporarily extracting a to-be-extracted region from measured data with a region growing technique; an initial position determiner for determining an initial position of a standard model for the to-be-extracted region using the to-be-extracted region temporarily extracted; and a to-be-extracted region extractor for extracting the to-be-extracted region from the measured data with a model fitting technique using the standard model.

According to this region extraction system, the initial position of the standard model in the model fitting technique is determined using the to-be-extracted region temporarily extracted from measured data with the region growing technique. Accordingly, the initial position of the standard model can be determined with higher accuracy, allowing highly accurate region extraction with the model fitting technique.

The present invention is also directed to a region extraction method and a program.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flow chart illustrating an overall operation of the region extraction system;

FIG. 6 illustrates a slice image in a predetermined position of a human body captured by an X-ray CT system;

FIG. 20 illustrates spine contained in a 3D image.

DESCRIPTION OF THE PREFERRED EMBODIMENTS

Hereinafter, a preferred embodiment of the present invention will be described in reference to the accompanied drawings.

Configuration

Figure 1:
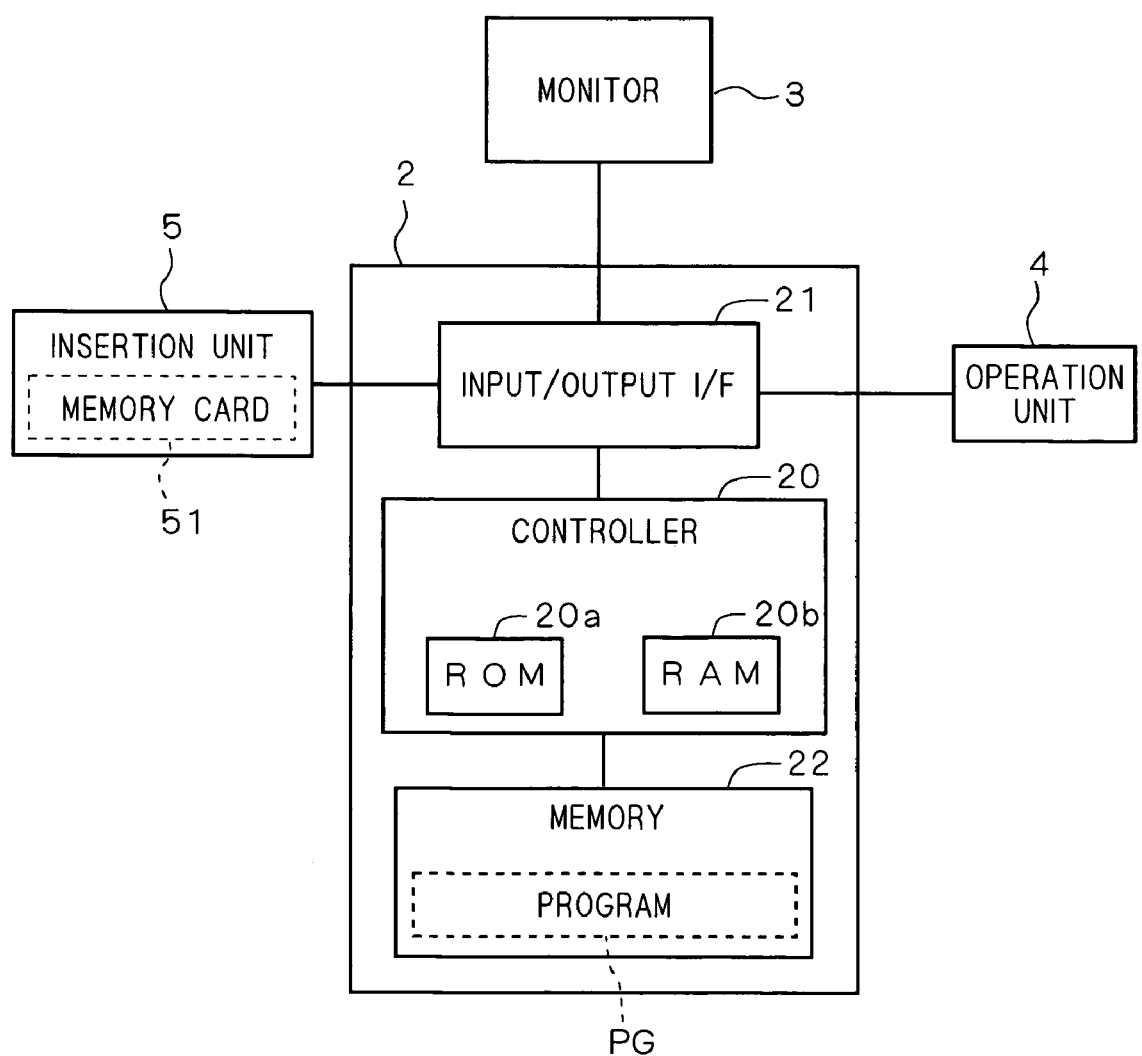
FIG. 1 generally illustrates a region extraction system according to a preferred embodiment of the present invention.

FIG. 1 generally illustrates a region extraction system 1 according to a preferred embodiment of the present invention.

The region extraction system 1 is a system for extracting a desired region (specifically, a stereoscopic region) from measured data (specifically, three-dimensional (3D) measured data (also referred to as "stereoscopic measured data")).

As shown in FIG. 1, the region extraction system 1 is provided with a personal computer (PC) 2, a monitor 3, an insertion unit 5 and an operation unit 4.

The PC 2 includes a controller 20, an input/output I/F 21 and a memory 22.

The input/output I/F 21 is an interface (I/F) for making data transmission between the PC 2 and the monitor 3, operation unit 4 and insertion unit 5, respectively, and makes data transmission to/from the controller 20.

The memory 22 is constructed from a hard disk and the like, for example, and stores a software program (hereinafter briefly referred to as a "program") PG and the like for executing region extraction.

The controller 20 mainly has a CPU, a ROM 20a, a RAM 20b and the like, for exercising centralized control of the respective units of the PC 2.

The monitor 3 is constructed from a CRT, for example, and visually outputs an image for display generated in the controller 20.

The operation unit 4 is constructed from a keyboard, a mouse and the like, and transmits various signals to the input/output I/F 21 in accordance with user's various operations.

The insertion unit 5 allows removable insertion of a recording medium such as a memory card 51, and allows various types of data, programs or the like stored in the memory card 51 inserted in the insertion unit 5 to be captured into the controller 20 or memory 22 through the input/output I/F 21.

Various functions equipped with the region extraction system 1 will be described hereinbelow.

Figure 2:
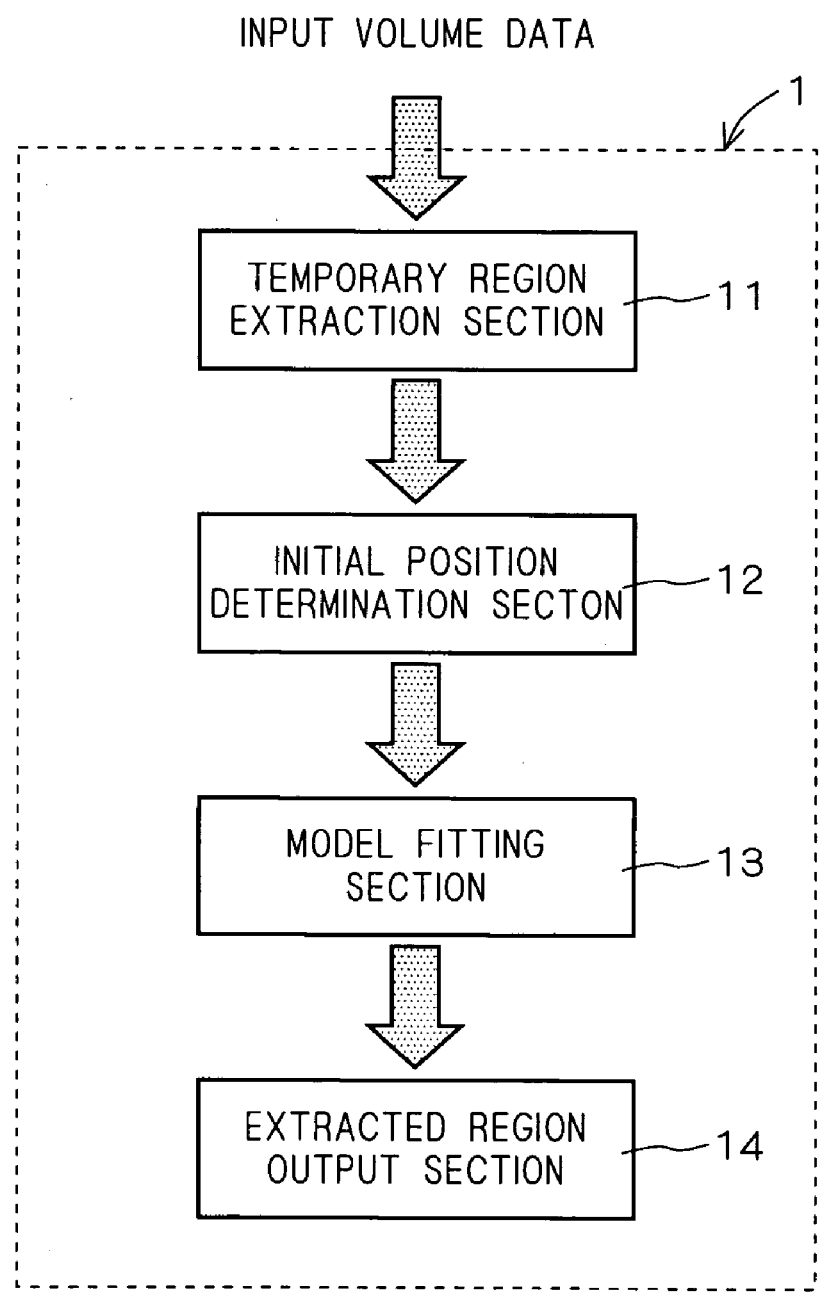
FIG. 2 is a block diagram illustrating various functions of the region extraction system.

FIG. 2 is a block diagram illustrating various functions of the region extraction system 1.

These various functions are implemented by executing a predetermined program PG using various types of hardware such as the CPU in the controller 20.

As shown in FIG. 2, the region extraction system 1 is provided with a temporary region extraction section 11, an initial position determination section 12, a model fitting section 13 and an extracted region output section 14, and is capable of extracting and outputting an object that a user wants to extract (hereinafter also referred to as "a to-be-extracted region (object)" (3D region) from an input 3D image (3D measured data).

The temporary region extraction section 11 has a function of temporarily extracting a to-be-extracted object (region) with a technique other than the model fitting technique, more specifically, a region growing technique (e.g., a 3D region growing technique).

The initial position determination section 12 has a function of determining the initial position of a standard model using the to-be-extracted object (region) temporarily extracted. Throughout the present specification, the "standard model" is a model used in the model fitting technique, and represents a standard model for a to-be-extracted region (e.g., organ).

The model fitting section 13 has a function of deforming the standard model with the model fitting technique to extract the to-be-extracted object (region).

The extracted region output section 14 has a function of outputting the extracted target object and displaying the object on the monitor 3.

General Outline of Operation

Now, each of the above-described functions of the region extraction system 1 will be described in more detail. The following description will be directed to an extraction process of an object (e.g., organ) from a medical 3D image (also referred to as "volume data") captured by an X-ray CT system, however, the present invention is also applicable to a region extraction process from other type of measured data (e.g., a medical 3D image captured by MRI or the like).

A 3D image captured by an X-ray CT system will be described hereinbelow.

Figure 3:
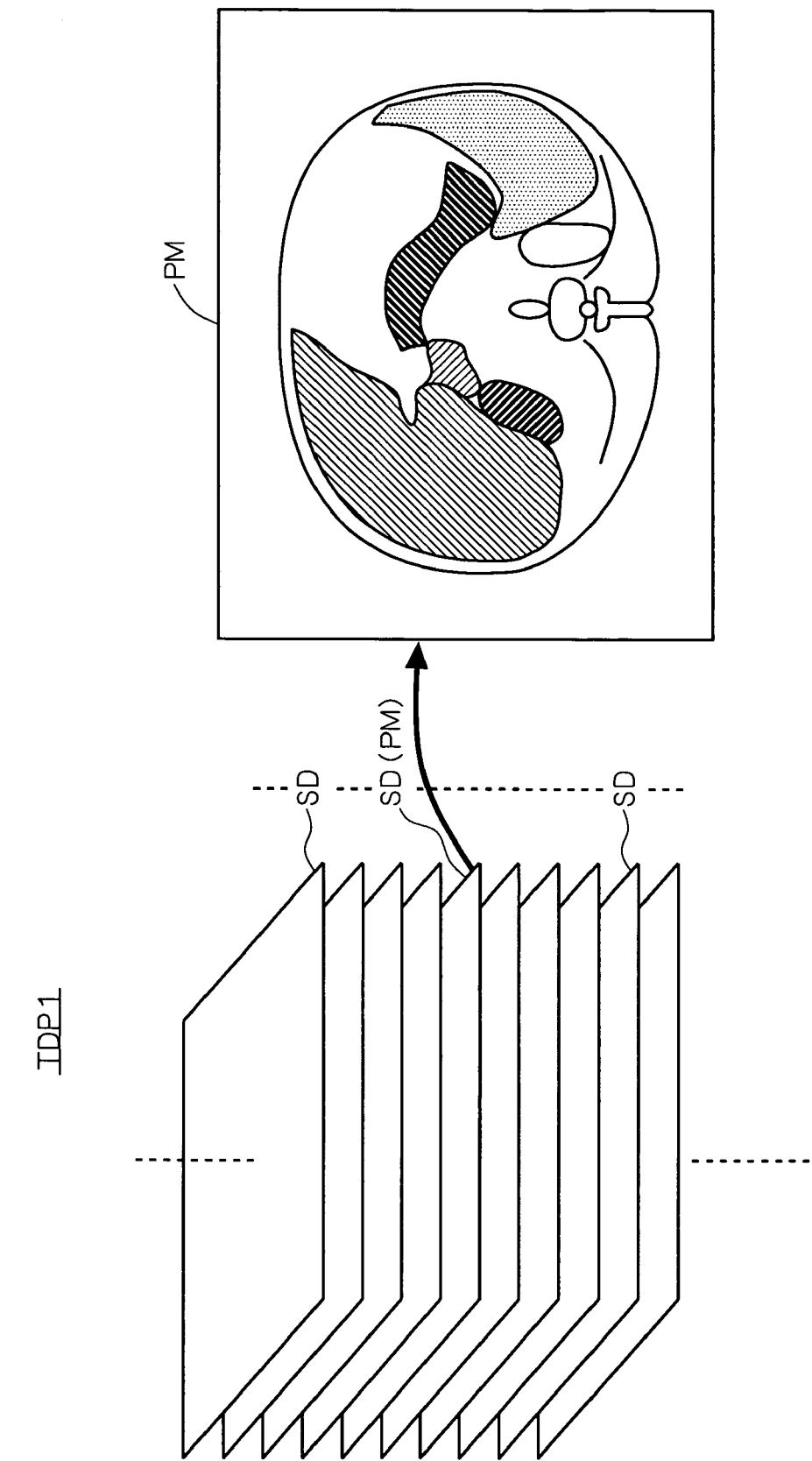
FIG. 3 illustrates a three-dimensional (3D) image captured by an X-ray CT system and slice images in a predetermined position.

FIG. 3 illustrates a 3D image TDP1 captured by the X-ray CT system.

As shown in FIG. 3, the 3D image TDP1 contains a plurality of (e.g., several tens to several hundreds of) slice images (tomographic images) SD showing cross sections of an object (human body). Each slice image SD is an image representing the amount of X-ray absorption (CT value) at each point (each pixel) visualized in shades of gray. FIG. 3 also shows a slice image PM in a predetermined position among the plurality of slice images SD constituting the 3D image TDP1.

FIG. 4 is a flow chart illustrating an overall operation of the region extraction system 1.

As shown in FIG. 4, the region extraction system 1 extracts an object (organ) specified by a user from an input image (3D image) by executing steps S1 to S4.

First, in step S1, the object (organ) specified by the user is temporarily extracted from a 3D image input to the region extraction system 1. As will be described later, in step S1, a to-be-extracted region is extracted with the region growing technique.

Next, in step S2, the initial position of a standard model (the initial position when placing the standard model in measured data) is determined using the object (organ) temporarily extracted in step S1, so that the standard model is positioned.

Further, in step S3, the standard model located in the initial position is deformed with the model fitting technique, to thereby create an individual model corresponding to the to-be-extracted object.

In step S4, the created individual model is output to the monitor 3 or the like as the to-be-extracted object.

In this manner, the to-be-extracted object is finally extracted with the model fitting technique (step S3). However, the region growing technique is used in determining the initial position of the standard model in the model fitting technique (steps S1, S2).

The to-be-extracted object is specified by a user prior to the start of step S1. As a method of specification, a mode may be adopted, for example, in which a user selects a desired item from the list of items of various organs previously databased and stored in the memory 22 by operating the operation unit 4 (e.g., mouse) or the like.

Each of the processes executed in steps S1 to S3 will be described hereinbelow in detail.

Temporary Region Extraction Process

As described above, the temporary region extraction process is intended to temporarily extract an object (organ) specified by a user. Here, the region growing technique is adopted.

Figure 5:
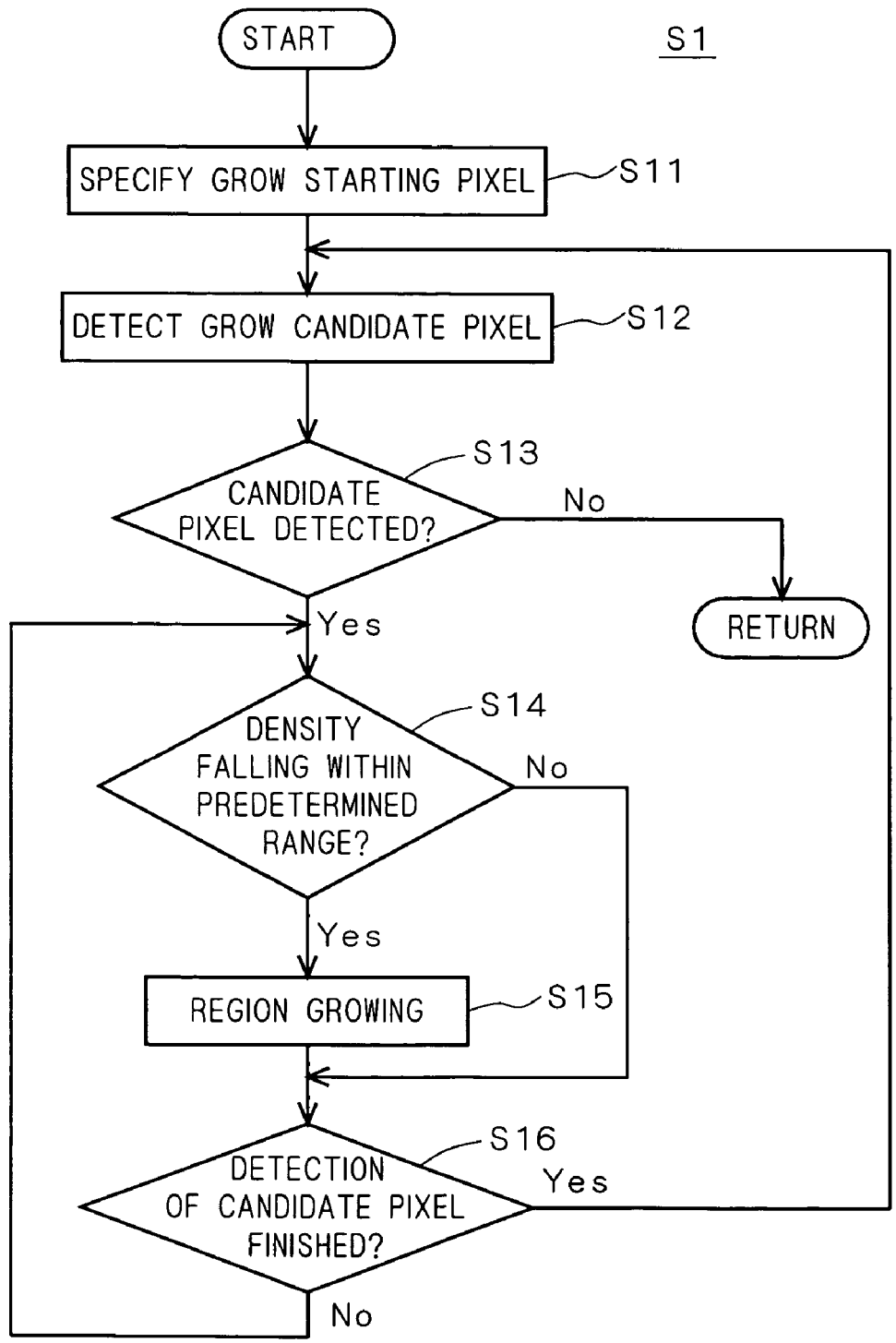
FIG. 5 is a flow chart illustrating a temporary region extraction process with a region growing technique.
Figure 7:
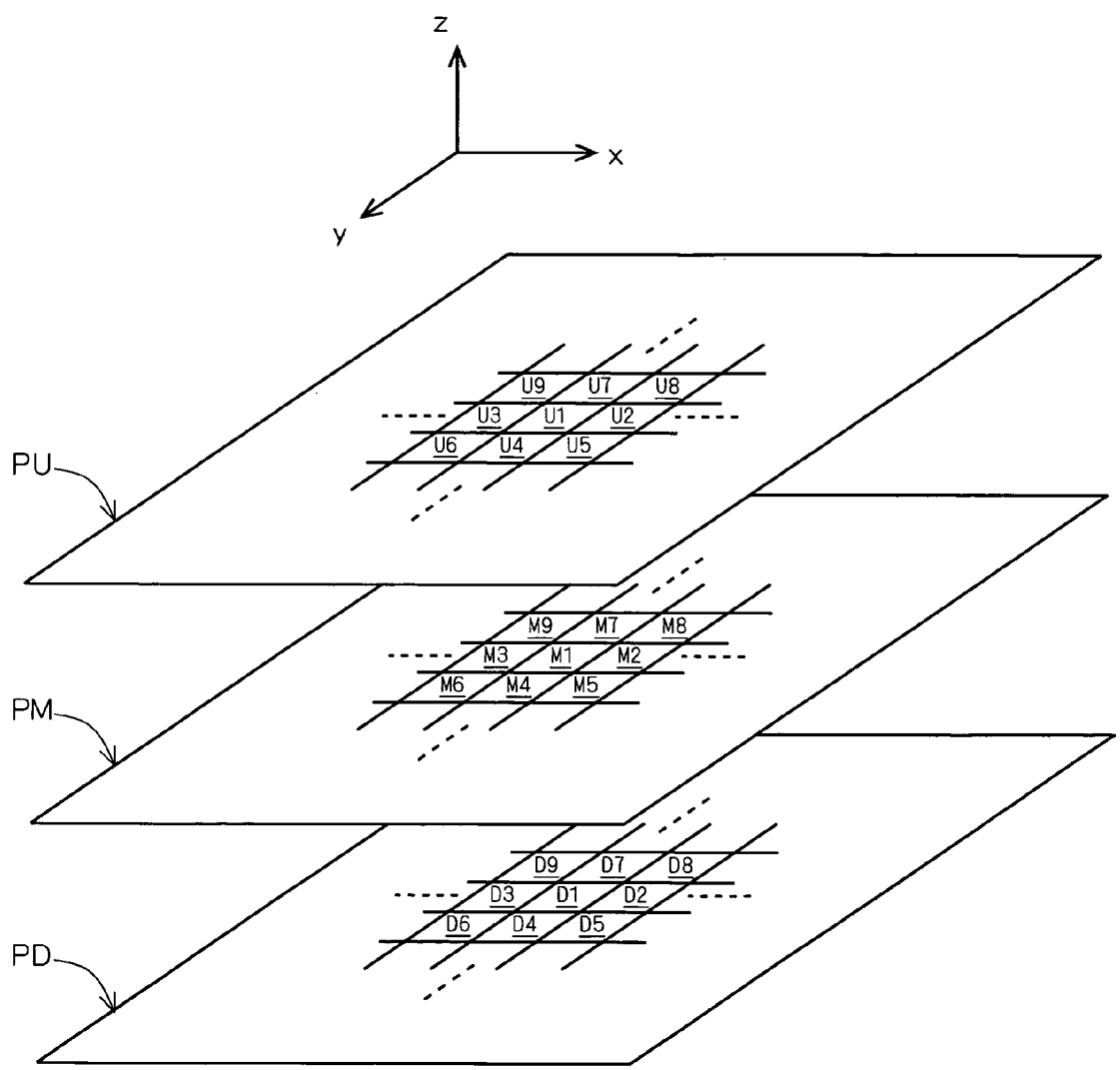
FIG. 7 is an enlarged view of and around a pixel on the slice image shown in FIG. 6.

FIG. 5 is a flow chart illustrating in detail the temporary region extraction process (step S1) with the region growing technique. FIG. 6 illustrates a slice image PM in a predetermined position of a human body captured by an X-ray CT system, and FIG. 7 is an enlarged view of and around pixels adjacent to a pixel M1 at the center on the slice image PM shown in FIG. 6. As pixels adjacent to the pixel M1 on the slice image PM, FIG. 7 shows, in addition to 8 adjacent pixels M2 to M9 on the slice image PM of the same level, 9 adjacent pixels U1 to U9 on a slice image PU and 9 adjacent pixels D1 to D9 on a slice image PD. The slice image PU is adjacent to the slice image PM in the +z direction (i.e., the slice image directly above the slice image PM), and the slice image PD is adjacent to the slice image PM in the −z direction (i.e., the slice image directly below the slice image PM).

The temporary region extraction process with the region growing technique will be discussed hereinbelow illustrating a specific example of temporarily extracting an object (organ) OB1 shown in the slice image PM of FIG. 6.

First, in step S11, a grow starting pixel (also referred to as a "starting point") in a to-be-extracted object (organ) is specified by a user. Specifically, on an arbitrary slice image (in this case, the slice image PM) on which a to-be-extracted object is shown, an arbitrary point in the to-be-extracted object is specified by operating the operation unit 4 (e.g., mouse) or the like. More specifically, when the object OB1 is to be extracted, an arbitrary point (e.g., M1) in the object (organ) OB1 on the slice image PM may be specified by the mouse or the like (cf. FIG. 6). With this operation, a pixel corresponding to the specified point M1 on the slice image PM becomes a grow starting pixel.

Next, in step S12, pixels adjacent to the grow starting pixel are detected as grow candidate pixels. Specifically, when the pixel M1 is specified as the grow starting pixel in step S11, all pixels adjacent to the pixel M1 become grow candidate pixels. That is, the pixels M2 to M9 on the slice image PM, pixels U1 to U9 on the slice image PU and pixels D1 to D9 on the slice image PD become grow candidate pixels.

Next, in step S13, it is judged whether or not grow candidate pixels have been detected in step S12, and when grow candidate pixels have been detected in step S12, the process proceeds into step S14.

In step S14, it is judged whether or not the detected grow candidate pixels each have a density falling within a predetermined range. Specifically, the range of density of an object (organ) is previously specified for each object (organ), and it is judged whether or not the grow candidate pixels each have a density falling within the density of the to-be-extracted object. When it is judged that the grow candidate pixels each have a density falling within the predetermined range, the process proceeds into step S15.

In step S15, region growing is carried out for specifying the grow candidate pixels as belonging to the to-be-extracted region.

On the other hand, when it is judged in step S14 that a grow candidate pixel does not have a density falling within the predetermined range, region growing for that grow candidate pixel is not carried out.

Next, in step S16, it is judged whether or not there exist a grow candidate pixel yet to be subjected to the density judgment (step S14) of grow candidate pixels.

When there exists a grow candidate pixel yet to be subjected to the density judgment (step S14), that grow candidate pixel undergoes the processing in steps S14 and S16.

On the other hand, when the density judgment (step S14) has been completed for all the grow candidate pixels, the process returns to step S12, and pixels further adjacent to the pixels grown in step S15 yet to be judged whether or not they belong to the to-be-extracted region are detected as new grow candidate pixels. The pixels grown in step S15 have been specified as belonging to the to-be-extracted region. Thereafter, the above-described steps S13 to S16 are executed on the newly detected grow candidate pixels. Steps S12 to S16 are repeated as long as new grow candidate pixels can be detected, and when no new grow candidate pixels are detected, the temporary region extraction process is finished (step S13).

As described, the steps S12 to S16 are executed repeatedly to thereby gradually carry out region growing from the grow starting pixel, so that the object (organ) specified by a user is temporarily extracted.

Initial Position Determination Process

Figure 8:
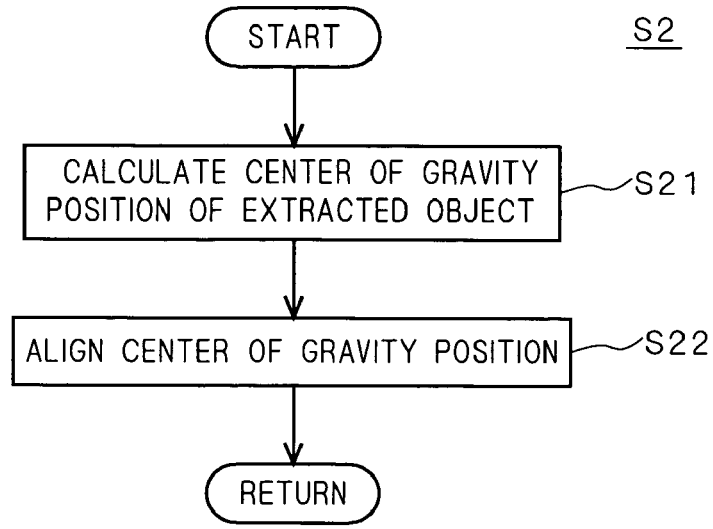
FIG. 8 is a flow chart illustrating an initial position determination process using the position of gravity center.
Figure 9:
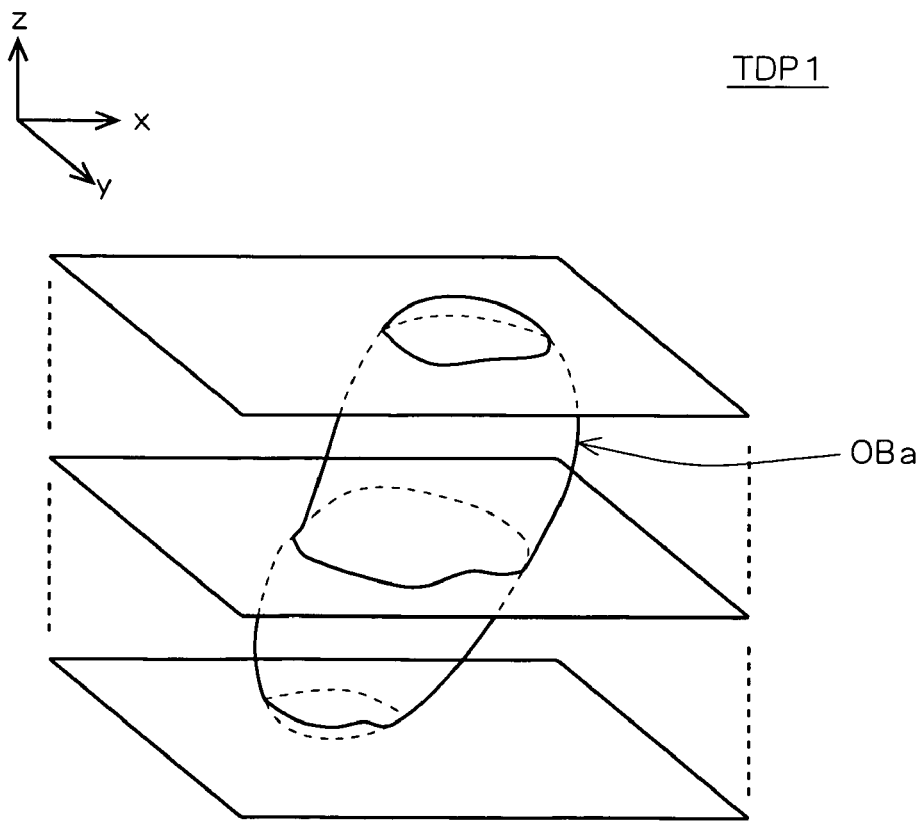
FIG. 9 illustrates an object contained in a 3D image.

The initial position determination process (step S2) for determining the initial position of the standard model with the model fitting technique will now be discussed with reference to FIGS. 8 to 11. FIG. 8 is a flow chart illustrating in detail the initial position determination process (step S2) using the position of gravity center. FIG. 9 illustrates an object OBa contained in a 3D image (measured data). FIG. 11 conceptually illustrates how a standard model SO is shifted to the initial position. FIG. 11 also shows the positional relationship between a to-be-extracted object and the standard model when the standard model is initially positioned.

For ease of description, the object OBa present in the 3D image TDP1 as shown in FIG. 9 will be assumed to be a to-be-extracted object hereinbelow.

First, in step S21, the position of gravity center GZ of the object OBa temporarily extracted in step S1 is calculated.

Next, in step S22, the initial positioning of the standard model is carried out by aligning the position of gravity center GH of the standard model used in model fitting which will be described later with the position of gravity center GZ calculated in step S21. For instance, as shown in FIG. 11, the standard model SO is shifted such that the position of gravity center GH of the standard model SO is aligned with the position of gravity center GZ of the to-be-extracted object OBa, to thereby initially position the standard model SO in measured data.

When the initial positioning of the standard model using the position of gravity centers is finished, the operation proceeds into the model fitting process (step S3).

Model Fitting Process

The model fitting process in step S3 is a process for deforming the "standard model" which is a previously-prepared general model for a to-be-extracted object using information acquired from the to-be-extracted object (shape, etc.). Throughout the present specification, a standard model as deformed through the model fitting process (i.e., a standard model that reflects information on the to-be-extracted object) will be called an "individual model" as well.

In this model fitting process, the standard model located in the initial position is deformed with the model fitting technique, to thereby extract the to-be-extracted object.

Figure 10:
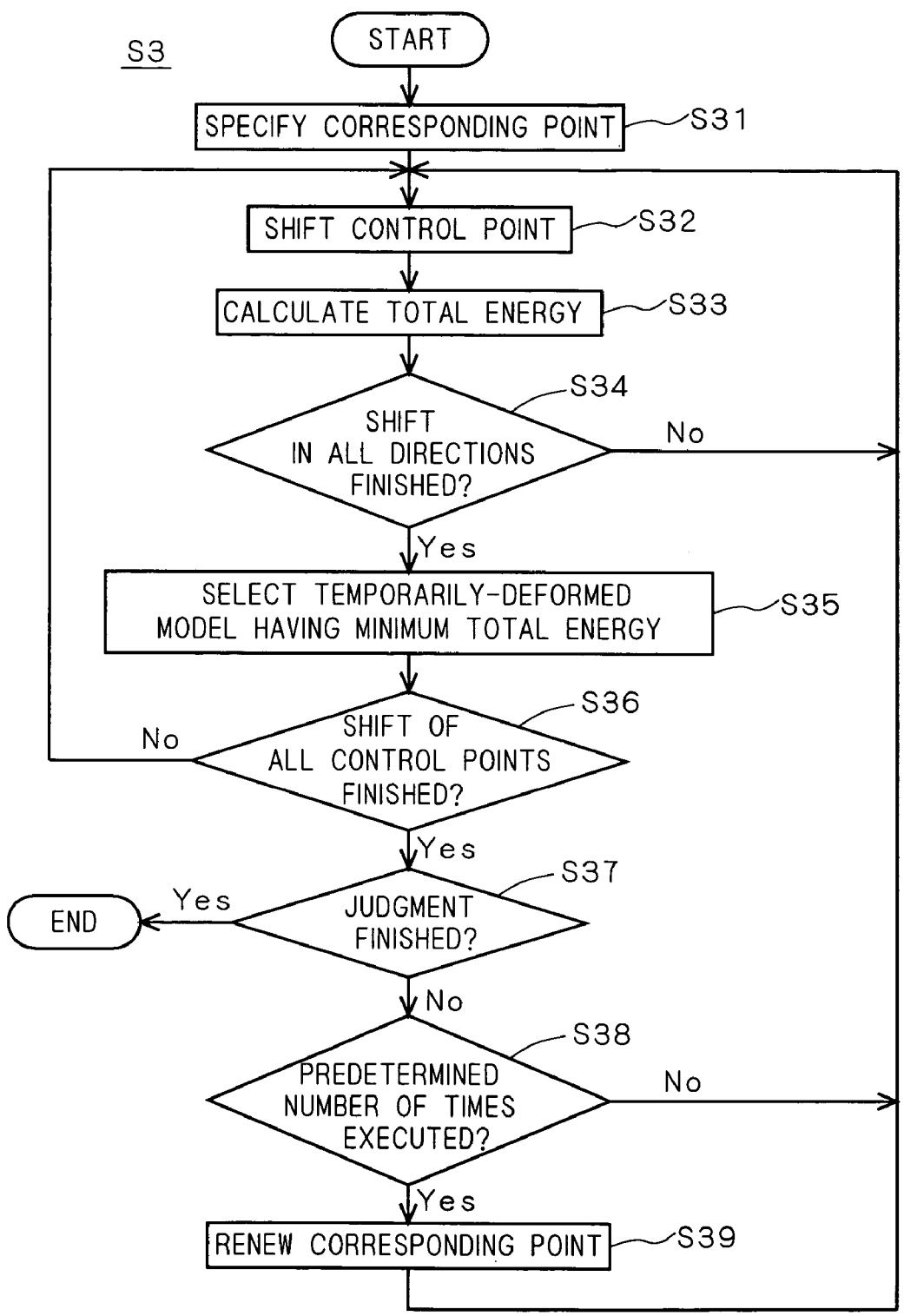
FIG. 10 is a flow chart illustrating a model fitting process.
Figure 11:
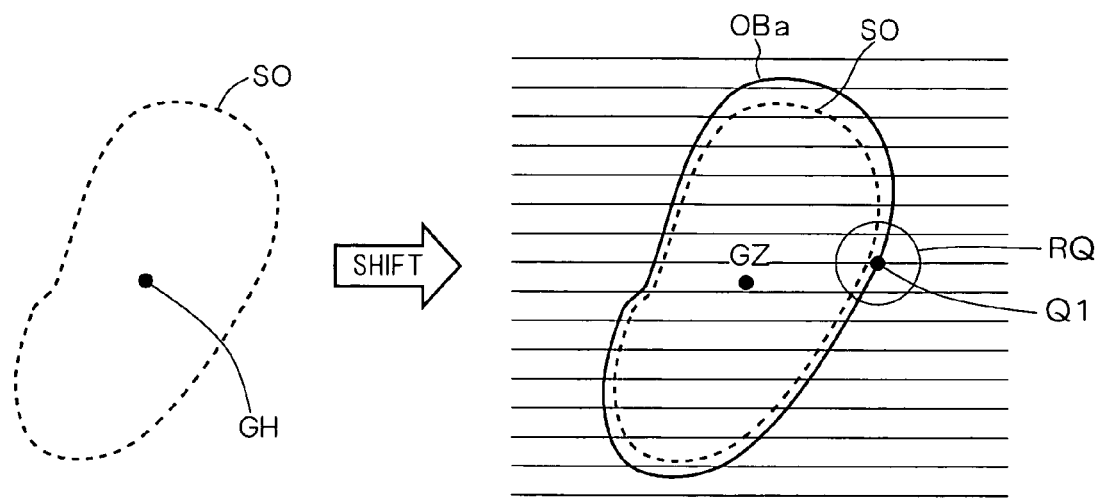
FIG. 11 illustrates how a standard model is shifted to the initial position.
Figure 12:
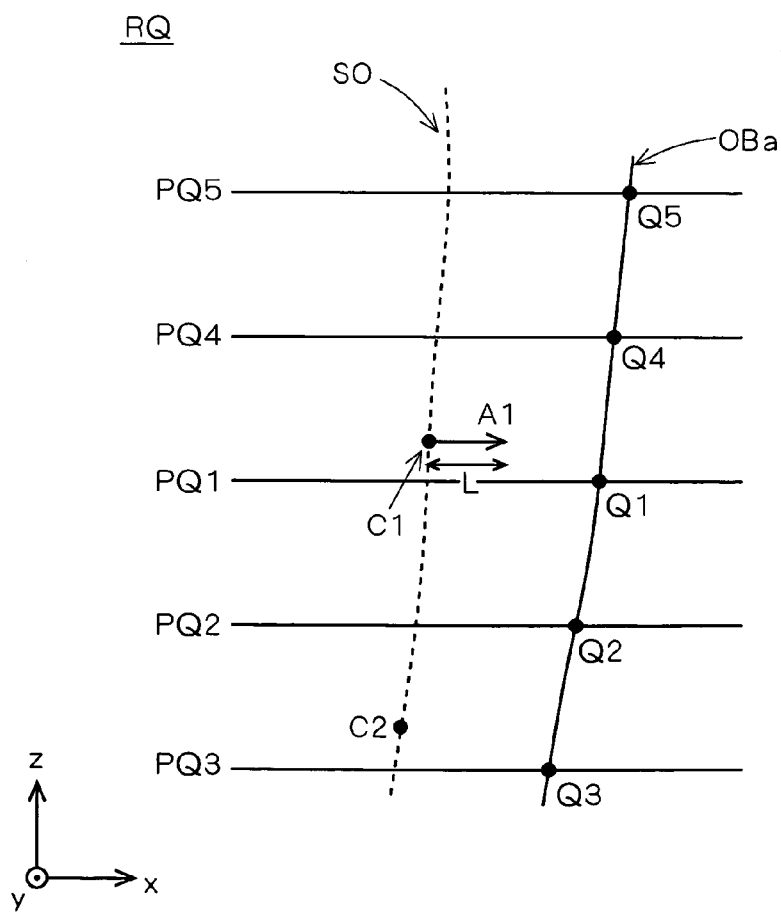
FIG. 12 illustrates the relationship between the standard model located in the initial position and a to-be-extracted object.
Figure 13:
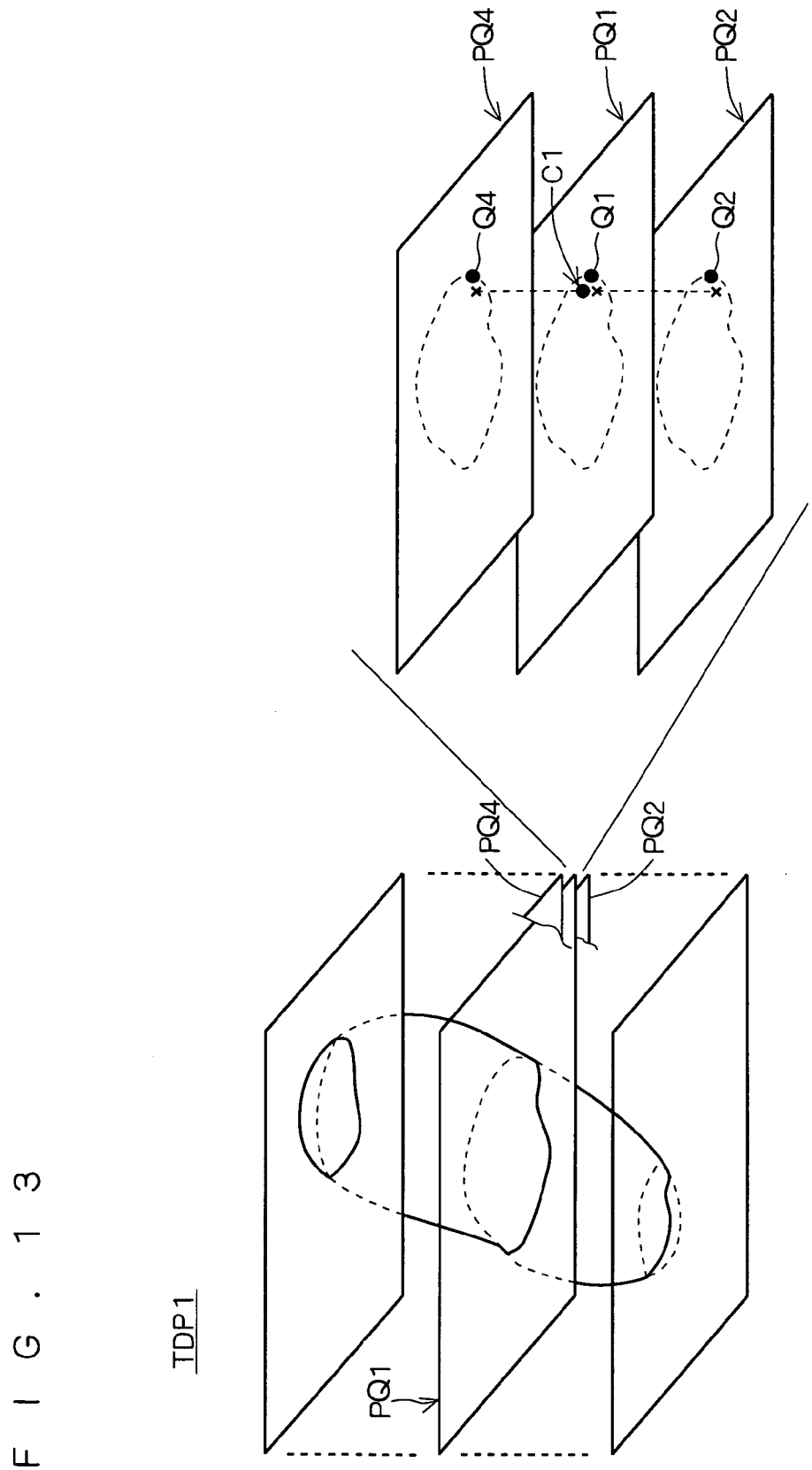
FIG. 13 illustrates slice images.
Figure 14:
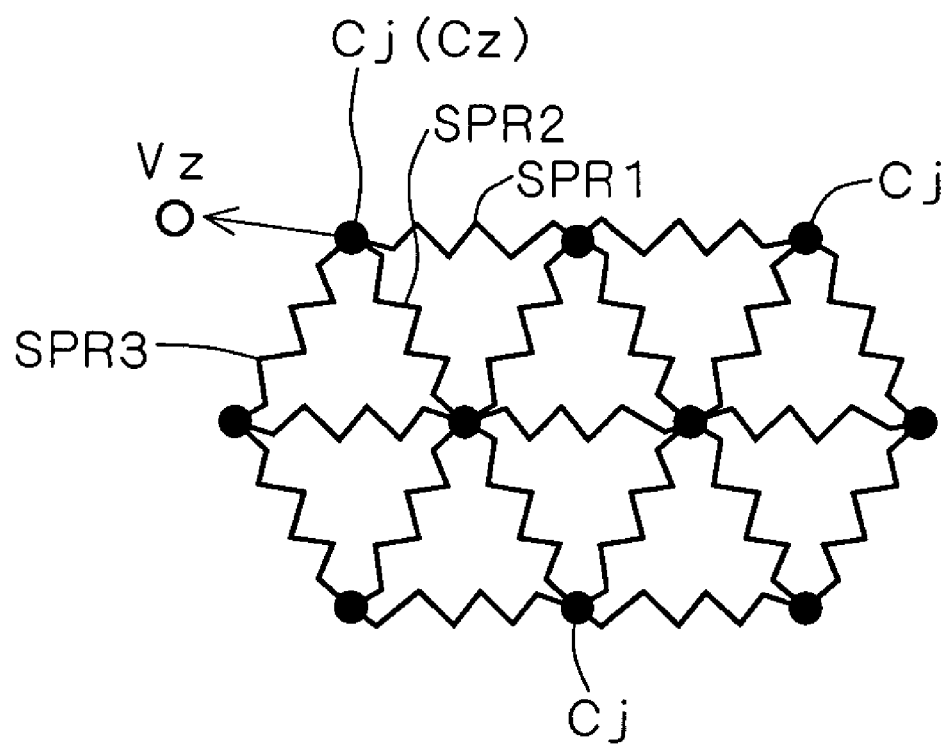
FIG. 14 is a schematic view illustrating control points connected to each other with imaginary springs.

FIG. 10 is a flow chart illustrating the model fitting process (step S3) in detail. FIG. 12 is a schematic enlarged view of and around a region RQ (cf. FIG. 11) centered around a boundary point Q1 of the to-be-extracted object OBa, and FIG. 13 illustrates some slice images, PQ1, PQ2 and PQ4. FIG. 14 is a schematic view illustrating control points connected to each other with imaginary springs.

The standard model of the to-be-extracted object is constituted from, for example, minute polygons (e.g., triangle), and is stored in the memory 22 or the like. The surface configuration of the standard model constituted from the polygons can be represented by 3D coordinates of the vertex of each polygon. Among the vertices of the polygons in the standard model, all or some representative vertices will be called "control points" as well.

The model fitting process will be discussed hereinbelow in detail with reference to FIGS. 10 to 14.

First, in step S31, a point (hereinafter also referred to as a "corresponding point") corresponding to a control point Cj of the standard model SO is specified (cf. FIG. 10). Here, a method is adopted in which, among pixels representing the contour (boundary) of the to-be-extracted object OBa (also referred to as "boundary points" or "boundary pixels"), a pixel located closest to each control point Cj is specified as a corresponding point of the control point Cj. Therefore, in the model fitting process according to the present embodiment, boundary pixels of the to-be-extracted object OBa are associated with control points of the standard model, to thereby achieve the fitting process.

The contour (boundary) of the to-be-extracted object OBa can be obtained by carrying out edge extraction in each slice image SD. The boundary of the object temporarily extracted with the region growing technique in step S1 may be used as the contour (boundary) of the to-be-extracted object OBa.

For instance, in FIG. 12 (elevational view), the corresponding point of the control point C1 is the boundary point (boundary pixel) Q1 located closest to the control point C1. Here, FIG. 12 only shows boundary points in a predetermined plane (2D space) parallel to the xz plane; practically, however, a boundary point located closest to the control point C1 in a 3D space as shown in FIG. 13 is specified as a corresponding point of the control point C1. In FIG. 13, respective projected points of the control point C1 in the slice images PQ1, PQ2 and PQ4 are indicated with the mark x.

Next, in step S32, an arbitrary point among the control points Cj of the standard model (hereinafter also referred to as a "to-be-shifted point") (e.g., control point C1) is shifted by a slight amount L in one direction (e.g., in A1 direction) (cf. FIG. 12).

Further, in step S33, the total energy Ue of a model temporarily deformed by shifting the to-be-shifted point in step S32 (hereinafter, also referred to as a "temporarily-deformed model") is calculated.

The total energy Ue is expressed as the sum of external energy Fe relative to the distance between a control point Cj and its corresponding point and internal energy Ge for preventing excessive deformation, as shown by the following equation (1). The external energy Fe and internal energy Ge will be discussed later.

$$Ue=Fe+Ge \qquad (1)$$

Next, in step S34, it is judged whether or not the to-be-shifted point has been shifted to all directions. For instance, let the to-be-shifted point be shifted in 26 directions (directions toward 26 pixels adjacent to the to-be-shifted point (pixel)) in all orientations in the 3D space, it is judged whether or not the control point C1 has been shifted in all the 26 directions.

In the case where the creation of temporarily-deformed models with the to-be-shifted point (control point C1) shifted in the 26 directions, respectively, has not been finished, the shift direction of the to-be-shifted point is changed to shift the to-be-shifted point again by the slight amount L, so that another temporarily-deformed model having a different pattern of shift direction is created, and the total energy Ue of the temporarily-deformed model is calculated (steps S32, S33).

Then, it is judged in step S34 that the shift in all the directions has been finished, the process proceeds into step S35.

In step S35, a temporarily-deformed model having the lowest total energy Ue is selected from among all the patterns of temporarily-deformed models as created. In other words, a temporarily-deformed model that minimizes the total energy Ue is selected from among the respective temporarily-deformed models created by shifting a certain control point Cj in the 26 directions, respectively. For instance, by the action of the internal energy Ge and external energy Fe as will be described later, a temporarily-deformed model whose control point is shifted in a direction that approaches its corresponding point is selected when only the external energy Fe is taken into consideration without considering the internal energy Ge. However, when the internal energy Ge is taken into consideration, a temporarily-deformed model whose control point is shifted in a direction other than the direction that approaches its corresponding point may be selected.

Next, it is judged in step S36 whether or not the shift of all control points Cj has been finished. Specifically, it is judged whether or not the shift of all control points Cj of the standard model by the slight amount L has been finished. When there exists a control point yet to be shifted (also called an "unshifted point"), that control point (unshifted point) is specified as the to-be-shifted point, and the processing from steps S32 to S35 is repeated to create a temporarily-deformed model whose all control points Cj have been shifted. On the other hand, when the shift of all the control points Cj has been finished, the process proceeds into step S37.

In step S37, it is judged whether or not the model fitting process is to be finished. Specifically, under the condition that an average of respective distances between a plurality of control points and their corresponding points in a temporarily-deformed model whose all control points Cj have been shifted is a predetermined value or below, the model fitting process shall be finished when that condition is satisfied. The process can thereby be finished when each control point Cj has approached its corresponding point to a certain degree. In addition, or alternatively, the judgment of whether to finish the process may be made on the basis of whether or not the amount of change in total energy Ue between a previous temporarily-deformed model (whose all control points Cj have been shifted) and a current temporarily-deformed model is a predetermined amount or below. The process can thereby be finished when the total energy Ue hardly changes with the shift of control points Cj.

When it is judged in step S37 that the model fitting process is not to be finished, the process proceeds into step S38.

In step S38, assuming the processing executed from steps S32 to S37 as a unit processing loop, it is judged whether or not the unit processing loop has been executed a predetermined number of times W (e.g., 10 times). If No, the processing loop from steps S32 to S37 is repeated the predetermined number of times W. If Yes, the process proceeds into step S39. In other words, the unit processing loop is repeated until a temporarily-deformed model whose all control points Cj have been shifted is created the predetermined number of times W.

In step S39, renewal of the corresponding points specified in step S31 is carried out. Specifically, renewal of the corresponding points is carried out by which boundary pixels (boundary points) located closest to the respective control points Cj shifted the predetermined number of times W through the above-described processing loop are specified as new corresponding points of the respective control points Cj, and the processing from steps S32 to S39 is performed repeatedly. Such "renewal of corresponding points" allows optimization of corresponding points even when boundary points closest to control points Cj change along with the shift of the control points Cj.

On the other hand, when it is judged in step S37 that the model fitting process is to be finished, a temporarily-deformed model finally obtained is specified as an individual model corresponding to the to-be-extracted object, and the process in step S3 is finished.

In the above-described model fitting process (step S3), the standard model is gradually deformed per control point by the slight amount L, to thereby create an individual model corresponding to the to-be-extracted region.

Now, the external energy Fe and internal energy Ge constituting the total energy Ue will be described.

The external energy Fe is expressed by the following equation (2) using the square of the distance between each control point Cj and its corresponding point Qj:

$$Fe = \frac{\alpha}{Nt} \sum_{j=1}^{Nt} |Cj - Qj|^2 \qquad (2)$$

where α is a constant, Nt is the number of control points, and |Cj−Qj| denotes the distance between a control point Cj and its corresponding point Qj.

Such temporarily-deformed model whose external energy Fe is very high, that is, a temporarily-deformed model whose distance between a control point Cj and its corresponding point Qj is longer than prior to the shift has a higher total energy Ue, which is therefore less likely to be selected in the aforementioned step S35 (of selecting a temporarily-deformed model that minimizes the total energy Ue).

Assuming that, for example, control points Cj are connected to each other with imaginary springs SPR (SPR1, SPR2, SPR3, . . . ) as shown in FIG. 14, the internal energy Ge is expressed by the following equation (3):

$$Ge = \frac{\beta \cdot K}{Nh} \sum_{i=1}^{Nh} w^2 i \qquad (3)$$

where β is a constant, K is a spring factor of imaginary springs, Nh is the number of imaginary springs, and w is the amount of displacement of each imaginary spring.

According to the equation (3), an excessive shift of each control point Cj is expressed as an increase in energy stored in the imaginary springs SPR. For instance, assuming that a control point Cz is shifted to a point Vz so that a displacement relative to other control points increases, energy produced by extension of each imaginary spring is stored in each of the imaginary springs SPR1, SPR2 and SPR3, which results in an increase in the internal energy Ge and hence the total energy Ue.

A temporarily-deformed model with such excessive deformation has a high internal energy Ge and hence a high total energy Ue, which is less likely to be selected in the aforementioned step S35.

In other words, selection of a temporarily-deformed model whose internal energy Ge is reduced to reduce the total energy Ue in step S35 can produce the effect of preventing an excessive deformation caused by the shift of each control point Cj.

That is, introduction of such internal energy Ge allows the shift of control points Cj such that the shape of the standard model, i.e., the shape of each polygon constituting the standard model is not affected.

Through the above-described processing, a temporarily-deformed model that minimizes the total energy Ue expressed as the sum of the external energy Fe and internal energy Ge is specified as a temporarily-deformed model obtained by deforming the standard model optimally (also referred to as an "optimum deformed model"), i.e., an individual model. Then, a region located in a position corresponding to that individual model is extracted as a to-be-extracted region. Accordingly, appropriate region extraction is achieved.

The method of minimizing the total energy Ue (energy function optimization method) is not limited to the above-described one, but the total energy Ue may be optimized using a mathematical method such as the quasi-Newton method or Newton method, for example.

As described above, the region extraction system 1 temporarily extracts a to-be-extracted region with the region growing technique prior to execution of the model fitting using the standard model, and determines the initial position of the standard model on the basis of the to-be-extracted region temporarily extracted. This allows precise initial positioning of the standard model, which achieves highly accurate model fitting.

Particularly, since the initial position of the standard model is determined using the to-be-extracted region temporarily extracted from measured data, information on each piece of measured data can be reflected in contrast to the case of always shifting the position of gravity center of the standard model to the position of gravity center registered in a database as in the aforementioned conventional art. This allows the initial position of the standard model to be determined precisely.

Modification

The preferred embodiment of the present invention has been described above, however, the present invention is not limited to the above description.

For instance, the above preferred embodiment has illustrated the method (also called a "method TQ1") of determining the initial position of the standard model using the position of gravity center in the initial position determination process (step S2), however, this is not a restrictive example. Specifically, the following method TQ2, TQ3, TQ4 or the like may be used.

Method TQ2 (Through the Use of Characteristic Point)

When the to-be-extracted object (object temporarily extracted in step S1) has a specific characteristic point (e.g., a leading edge point of an acute portion, etc.), the initial position of the standard model may be determined on the basis of the degree of matching between that characteristic point and a point corresponding to that characteristic point (also referred to as a "corresponding characteristic point") in the standard model.

Specifically, when the to-be-extracted object has one characteristic point, the initial positioning of the standard model may be carried out by extracting the characteristic point from a 3D image through predetermined image processing to shift a corresponding characteristic point in the standard model to that characteristic point extracted from the 3D image. As a method of extracting a characteristic point from a 3D image, a method of performing pattern matching using a previously-prepared image pattern relative to the characteristic point to thereby extract the characteristic point from the 3D image can be adopted, for example.

When the to-be-extracted object has a plurality of characteristic points, the correspondence between the to-be-extracted object and standard model with respect to the plurality of characteristic points may be used for the initial positioning of the standard model.

For instance, the standard model is adjusted such that one characteristic point of the standard model matches its corresponding point in the to-be-extracted object, and further, such that a direction vector from the one characteristic point to another matches between the standard model and to-be-extracted object. This allows initial positioning of the standard model in which the standard model and to-be-extracted object match also in inclination, rotation and the like.

Figure 15:
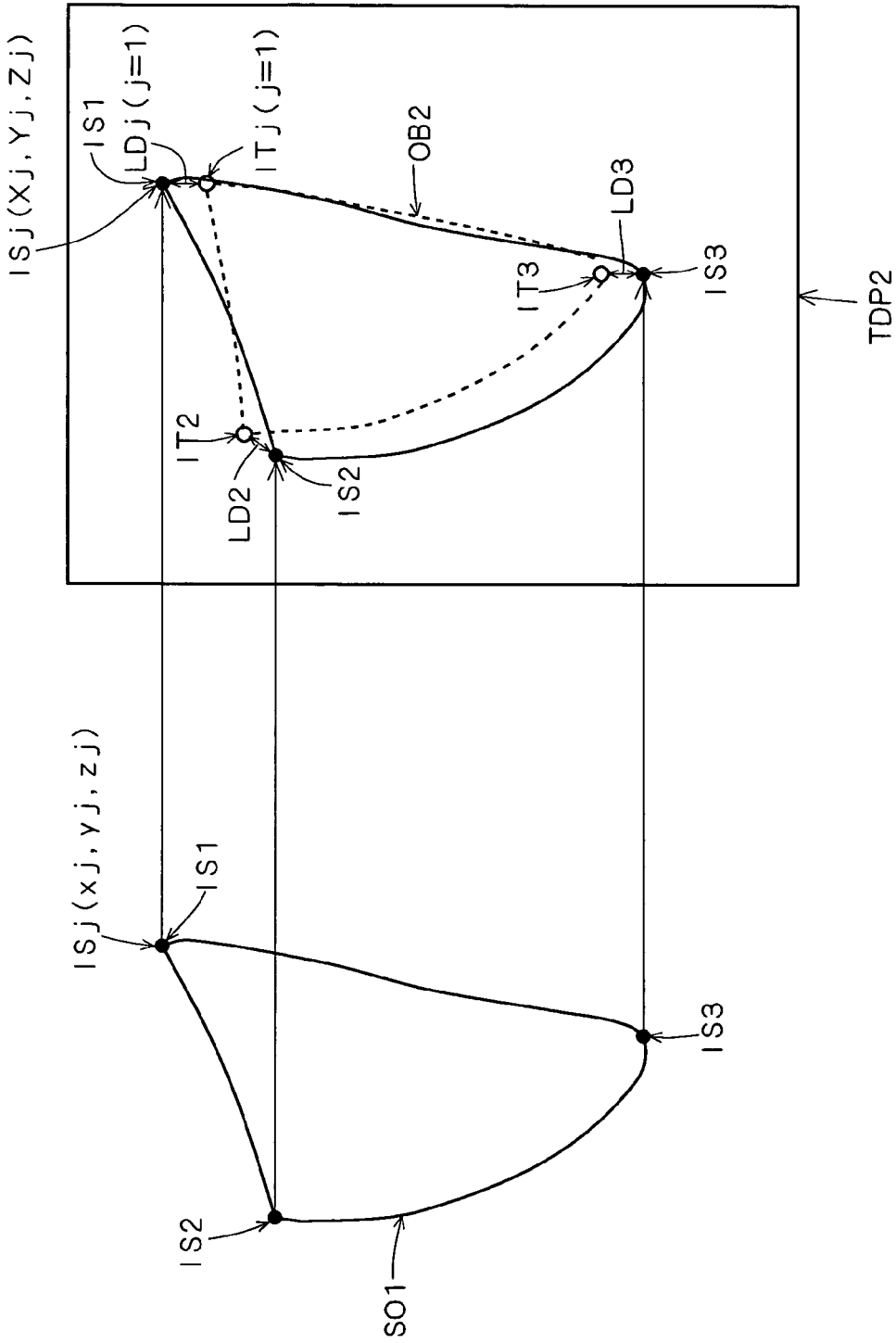
FIG. 15 illustrates initial positioning of a standard model having three characteristic points.

Alternatively, the initial positioning of the standard model may be carried out by defining a function that expresses the sum of respective distances between corresponding characteristic points and optimizing that function. FIG. 15 illustrates the initial positioning of a standard model SO1 having three characteristic points ISj (j=1, 2, 3).

Specifically, as shown in FIG. 15, the initial positioning is carried out so as to minimize the sum of respective distances LDj between the characteristic points ISj of the standard model SO1 as initially positioned and characteristic points ITj of a to-be-extracted object OB2 respectively corresponding thereto.

The 3D coordinates (Xj, Yj, Zj) of a characteristic point ISj of the standard model SO1 as initially positioned are expressed by the following equation (4) using the 3D coordinates (xj, yj, zj) prior to the initial positioning, a scale conversion (scaling) matrix SE, a rotation matrix RA that expresses rotational displacement ($\Phi$, $\theta$, $\psi$), and a translational displacement (Jx, Jy, Jz) along three perpendicular axes. The scaling matrix SE is a diagonal matrix whose diagonal elements are SEx, SEy and SEz.

$$\begin{pmatrix} Xj \\ Yj \\ Zj \end{pmatrix} = RA \cdot SE \begin{pmatrix} xj \\ yj \\ zj \end{pmatrix} + \begin{pmatrix} Jx \\ Jy \\ Jz \end{pmatrix} \quad (4)$$

Here, a function ED that expresses the sum of respective distances LDj between the characteristic points ISj (Xj, Yj, Zj) of the standard model SO1 in an imaginary initial position and the characteristic points ITj (aj, bj, cj) of the to-be-extracted object OB2 respectively corresponding to the characteristic points ISj is expressed by the following equation (5):

$$ED = \sum_{i=1}^{k} \sqrt{(Xj-aj)^2 + (Yj-bj)^2 + (Zj-cj)^2} \quad (5)$$

This function ED is also expressed as a function that defines the degree of matching between the characteristic points ITj of the to-be-extracted object OB2 temporarily extracted and the corresponding characteristic points ISj in the standard model SO1. The higher the degree of matching, the smaller the value of the function ED; conversely, the lower the degree of matching, the greater the value of the function ED.

Considering the equations (4) and (5), the function ED is expressed as a function whose respective elements of conversion parameter (vector) vt are variables. The conversion parameter vt consists of the aforementioned parameters Jx, Jy, Jz, $\Phi$, $\theta$, $\psi$, SEx, SEy and SEz.

Therefore, performing the optimization by the quasi-Newton method or the like to calculate a conversion parameter vt that optimizes (minimizes) the function ED, the optimum coordinates (Xj, Yj, Zj) of each characteristic point ISj can be determined.

By the above-described method, the optimum coordinates of each characteristic point ISj are determined so as to increase the degree of matching between each of the characteristic points ITj of the to-be-extracted object OB2 temporarily extracted and a corresponding one of the characteristic points ISj in the standard model SO1 to initially position the standard model SO1, which allows the initial position of the standard model SO1 to be determined taking into consideration the respective displacements of translation, rotation and scaling. Method TQ3 (through the use of the degree of overlap)

Figure 16:
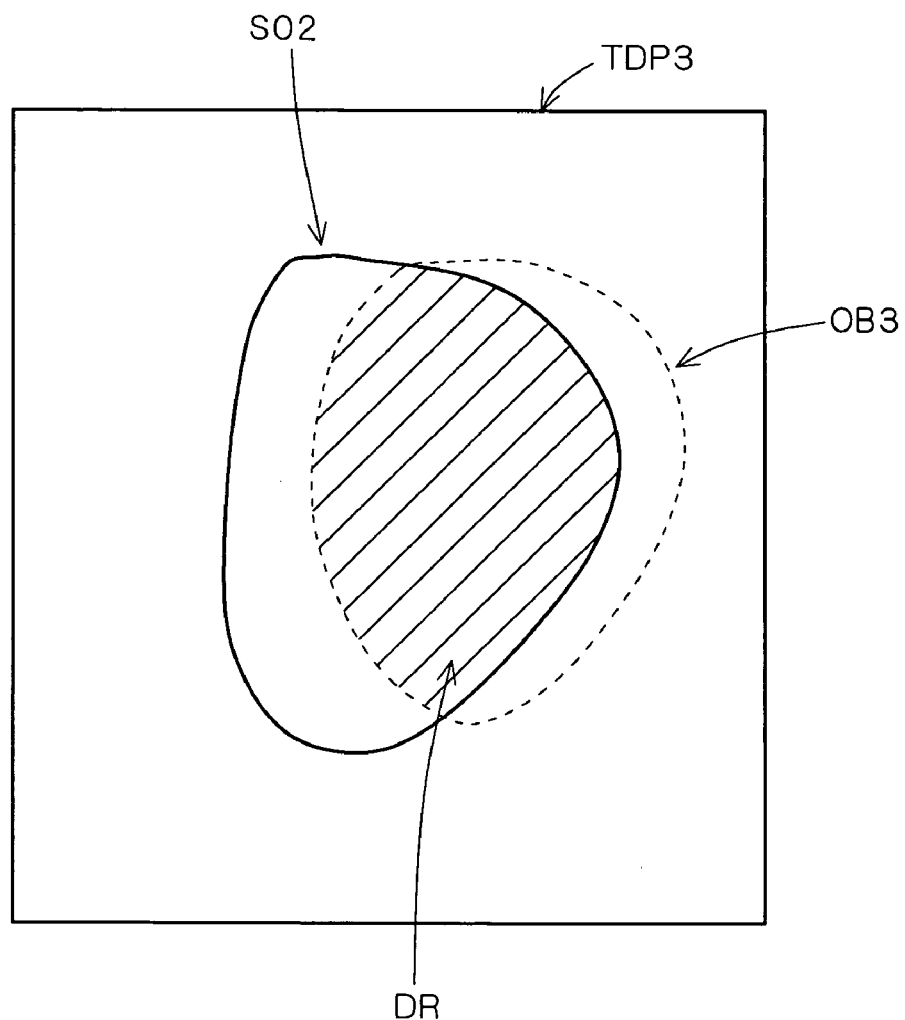
FIG. 16 illustrates a standard model located in a 3D image.

The initial position of a standard model SO2 may be determined on the basis of the degree of overlap between the standard model SO2 and a to-be-extracted object OB3 temporarily extracted in step S1. FIG. 16 illustrates the standard model SO2 located in a 3D image TDP3.

As shown in FIG. 16, the standard model SO2 is gradually shifted in the 3D image TDP3 by predetermined amounts, to calculate the degree of overlap DG between the standard model SO2 and to-be-extracted object OB3 at each position. Then, a position where the degree of overlap DG reaches its highest value is specified as the initial position.

Here, the degree of overlap DG is expressed by the following equation (6) using the number of pixels of an overlapping portion, i.e., the volume of overlap DR between the standard model SO2 and to-be-extracted object OB3, the volume SOR of the standard model SO2 and the volume OBR of the to-be-extracted object OB3. The higher the degree of overlap DG, the greater the value of the function DG; conversely, the lower the degree of overlap DG, the smaller the value of the function DG.

$$DG = We \cdot \frac{DR}{SOR} + \frac{DR}{OBR} \quad (6)$$

where We is a weighting factor, DR/SOR is the rate of amount of overlap in the standard model SO2 and DR/OBR is the rate of amount of overlap in the to-be-extracted object OB3.

When determining the initial position on the basis of the degree of overlap DG, the position where the degree of overlap DG reaches its highest value may be determined by shifting the standard model SO2 (translationally and rotationally) as well as scaling the standard model SO2. Specifically, since the volume of overlap DR is a function whose aforementioned conversion parameter vt is variable, the function DG may be optimized (maximized) using any of various optimization methods such as the quasi-Newton method.

Such initial position determination method (TQ3) using the degree of overlap DG allows the initial position of the standard model to be determined even taking into consideration the translation, rotation and scaling of the standard model with respect to a to-be-extracted object.

Method TQ4 (Combination of TQ1 to TQ3)

The initial position of the standard model may be determined combining the aforementioned initial position determination methods (TQ1 to TQ3).

For instance, the methods TQ1 and TQ2 may be combined. That is, the initial positioning of the standard model may be carried out using the correspondence between a plurality of points including the position of gravity center and characteristic points. Accordingly, the correspondence between the standard model and a 3D image is determined using the correspondence between the plurality of points, which allows creation of the initial state in which the standard model and 3D image match relatively well in inclination and rotation as well.

Alternatively, the methods TQ1 and TQ3 may be combined to carry out the initial positioning of the standard model.

Figure 17:
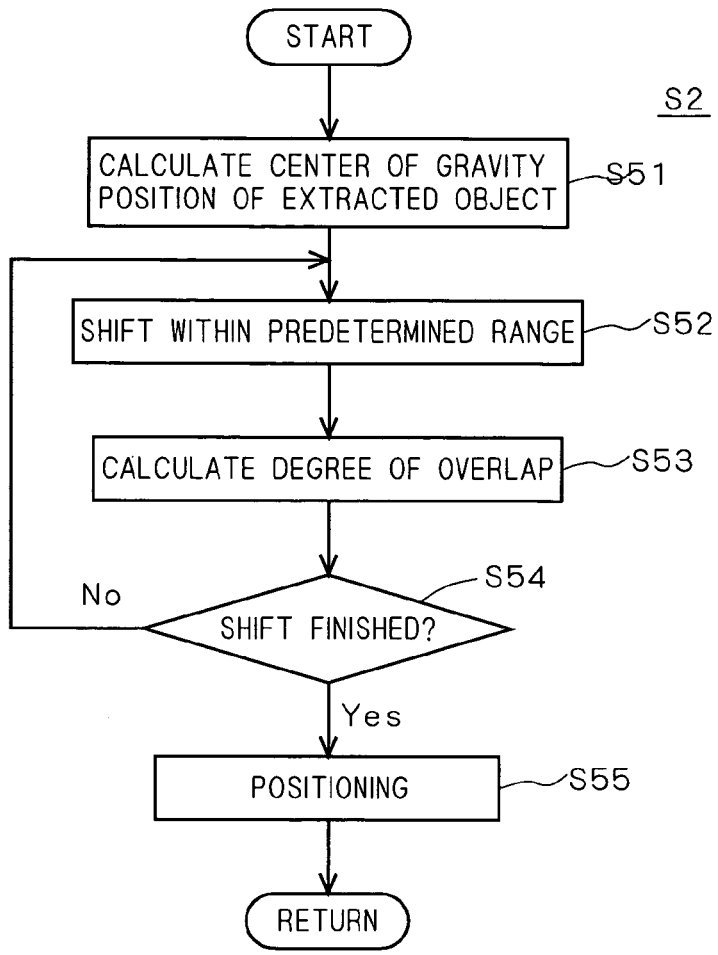
FIG. 17 is a flow chart illustrating an initial position determination process according to a modification.

The case of combining the methods TQ1 and TQ3 (i.e., combining the center-of-gravity matching process and the initial position determination process using the degree of overlap) is described with reference to FIG. 17. FIG. 17 is a flow chart illustrating the initial position determination process (step S2) according to such modification. For ease of description, the following illustrates the case of calculating respective values of functions DG obtained by imaginarily locating the standard model in a plurality of initial positions within a predetermined range to thereby specify an initial position where the function DG is optimized (maximized) as an optimum solution. The optimization method is not limited as such, but another optimization method such as the aforementioned quasi-Newton method may be used. Further, for ease of description, it is assumed here that the standard model only makes a translational movement in the initial positioning from a position prior to the movement; however, this is not a restrictive example. Deformation along with a rotational movement and scaling as described above may also be taken into consideration.

First in step S51, the position of gravity center of the object temporarily extracted in step S1 is calculated.

Next, in step S52, the standard model is shifted within a predetermined range centering on the position of gravity center calculated in step S51.

Then, in step S53, the degree of overlap DG between the standard model and to-be-extracted object is calculated.

Further, it is judged in step S54 whether or not shifts within the predetermined range have all been finished, and if Yes, the process proceeds into step S55.

In step S55, the initial position of the standard model is determined on the basis of the degree of overlap DG calculated in step S53.

On the other hand, when it is judged that shifts within the predetermined range have not been finished, the process returns to step S52, and the processing from steps S52 to S54 is repeated until the shifts within the predetermined range have been finished.

In this manner, the method of combining the center-of-gravity matching process and the initial position determination process using the degree of overlap allows high speed and precise initial positioning of the standard model.

Figure 18:
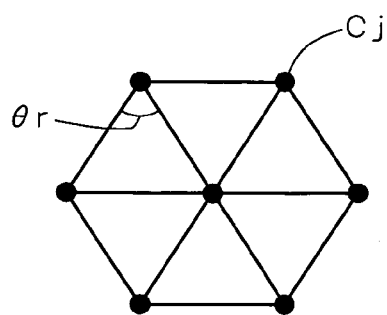
FIG. 18 illustrates an angle formed by straight lines connecting control points.

Further, in the above preferred embodiment, the energy produced by the imaginary springs between the control points Cj is considered as the internal energy Ge, but this is not a restrictive example. For instance, as shown in FIG. 18, a function that maintains an angle θr formed by straight lines connecting the respective control points Cj may be defined as the internal energy Ge.

Figure 19:
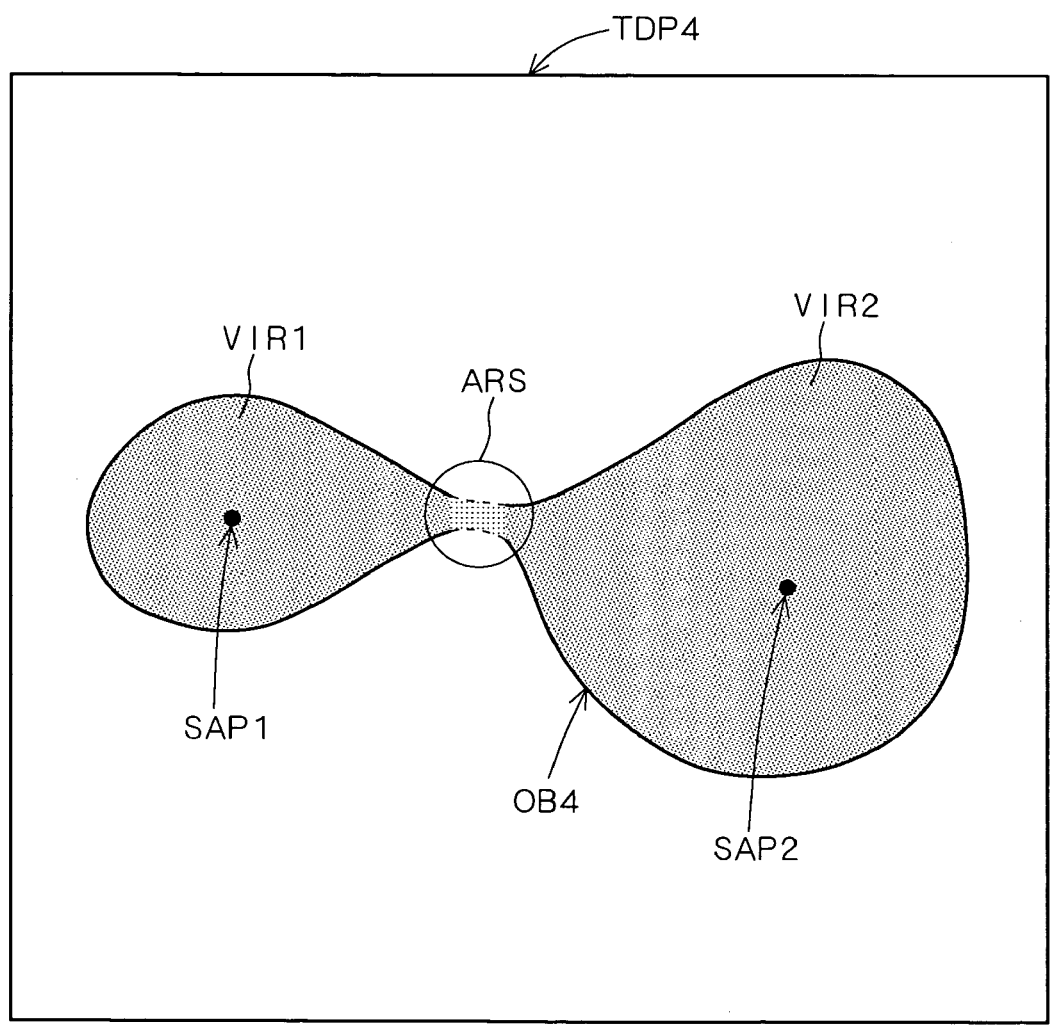
FIG. 19 illustrates a to-be-extracted object having a narrow portion.

Furthermore, in the step of specifying the grow starting pixel (step S11) according to the above-described embodiment, a user specifies an arbitrary point in the to-be-extracted object as the grow starting pixel (starting point), however, this is not a restrictive example. Specifically, a user may specify an arbitrary plurality of points in the to-be-extracted object as grow starting pixels (starting points). FIG. 19 illustrates a to-be-extracted object OB4 having a narrow portion ARS.

More specifically, in the case where the to-be-extracted object OB4 in a 3D image TDP4 is divided (or may be divided) at the narrow portion ARS and the like under the influence of noise or the like, it is preferable to specify grow starting pixels SAP (SAP1, SAP2) in respective divided regions VIR (VIR1, VIR2) (regions obtained by dividing the to-be-extracted object OB4 at the narrow portion ARS and the like) (cf. FIG. 19). Accordingly, each divided region can precisely be extracted while suppressing the influence of division, which allows precise extraction of the to-be-extracted object.

In the case where the to-be-extracted object is made of a set of individual portions, it is also preferable to specify a grow starting pixel in each of the individual portions. For instance, in the case of extracting a backbone HN as shown in FIG. 20 from a 3D image TDP5 with the region growing technique, it is preferable to specify a grow starting pixel MK in each individual portion KH (also referred to as a "vertebra"). Accordingly, the region growing can be executed from the grow starting pixel MK specified in each individual portion KH, allowing each individual portion KH to be extracted without fail, which in turn allows precise extraction of the entire backbone HN.

In the step of detecting grow candidate pixels (step S12) according to the above-described embodiment, all pixels (26 pixels) adjacent to the grow starting pixel are specified as grow candidate pixels to carry out region growing, however, this is not a restrictive example. For instance, 6 pixels in total, i.e., pixels (M2, M3) adjacent to the grow starting pixel M1 in the ±x direction, pixels (M4, M7) adjacent in the ±y direction, and pixels (U1, D1) adjacent in the ±z direction may be detected as grow candidate pixels.

In the temporary region extraction process (step S1) according to the above-described embodiment, 3D region growing (step S15) for growing the region three-dimensionally, however, this is not a restrictive example.

Specifically, a grow starting pixel may be specified on each of slice images constituting a 3D image to execute region growing (2D region growing) for growing a region two-dimensionally from the grow starting pixel on each slice image. More specifically, assuming that the pixel M1 is specified as a grow starting pixel in step S11 (cf. FIG. 7), 4 pixels in total, i.e., pixels M2, M3, M4 and M7 on the slice image PM, or 8 pixels in total, i.e., pixels M2 to M9 on the slice image PM may be specified as grow candidate pixels. The 3D region growing does not require a grow starting pixel to be specified on each slice image, which allows easier extraction of the to-be-extracted region.

In the above-described embodiment, a corresponding point to each control point Cj in the standard model SO is determined from a boundary pixel of the to-be-extracted object OBa obtained by the edge extraction process or region growing technique, however, this is not a restrictive example.

For instance, when a user can visually identify characteristic points specific to a to-be-extracted object (a leading edge point of an acute portion, etc.) by making a visual check of a 3D image, the user may associate that characteristic point directly with a control point corresponding to that characteristic point in the standard model SO by operating the operation unit 4 (mouse control, etc.).

While the invention has been shown and described in detail, the foregoing description is in all aspects illustrative and not restrictive. It is therefore understood that numerous modifications and variations can be devised without departing from the scope of the invention.

What is claimed is:

1. A region extraction system comprising:
   an operation unit for designating a specified point by a user;
   a temporary candidate region determiner for temporarily determining a candidate region of a to-be-extracted region from measured data with a region growing technique wherein the candidate region is determined by expanding an area from the specified point;
   an initial position determiner for determining an initial position of a standard model based on said candidate region temporarily determined;
   a characteristic point extractor for extracting a characteristic point of said candidate region temporarily determined; and
   a to-be-extracted region extractor for extracting said to-be-extracted region from said measured data with a model fitting technique using said standard model, wherein said initial position determiner determines said initial position of said standard model on the basis of the degree of matching between said characteristic point of said candidate region temporarily determined and a corresponding characteristic point in said standard model and determines said initial position of said standard model so as to obtain a minimum sum of distances each between the corresponding characteristic point after the determination of said initial position of said standard model and each of a plurality of corresponding characteristic points of said to-be-extracted region.

2. The region extraction system according to claim 1, wherein said measured data is three-dimensional measured data, and said temporary candidate region determiner temporarily determines said candidate region as a three-dimensional region from said three-dimensional measured data with a three-dimensional region growing technique.

3. The region extraction system according to claim 1, wherein said temporary candidate region determiner starts region growing with said region growing technique from a plurality of starting points.

4. The region extraction system according to claim 1, wherein said initial position determiner aligns a position of gravity center of said standard model with a position of gravity center of said candidate region temporarily determined, to thereby determine said initial position of said standard model.

5. The region extraction system according to claim 1, wherein said model fitting technique associates a boundary pixel of said candidate region temporarily determined with a control point of said standard model, to thereby carry out a fitting process.

6. The region extractor according to claim 1, wherein said measured data is medical image data.

7. A computer-implemented method of extracting a to-be-extracted region from measured data, wherein the computer performs the method comprising the steps of:

a) temporarily determining a candidate region of the to-be-extracted region from measured data with a region growing technique, wherein the candidate region is determined by expanding an area from a specified point designated by a user;

b) determining an initial position of a standard model based on said candidate region temporarily determined;

c) extracting said to-be-extracted region from said measured data with a model fitting technique using said standard model; and d) extracting a characteristic point of said candidate region temporarily determined, wherein said step b) includes the step of determining said initial position of said standard model on the basis of the degree of matching between said characteristic point of said candidate region temporarily determined and a corresponding characteristic point in said standard model and the step of determining said initial position of said standard model so as to obtain a minimum sum of distances each between the corresponding characteristic point after the determination of said initial position of said standard model and each of a plurality of corresponding characteristic points of said to-be-extracted region.

8. The computer-implemented method according to claim 7, wherein said measured data is three-dimensional measured data, and said step a) includes the step of temporarily determining said candidate region as a three-dimensional region from said three-dimensional measured data with a three-dimensional region growing technique.

9. The computer-implemented method according to claim 7, wherein said step a) includes the step of starting region growing with said region growing technique from a plurality of starting points.

10. The computer-implemented method according to claim 7, wherein said step b) includes the step of aligning a position of gravity center of said standard model with a position of gravity center of said candidate region temporarily determined, thereby determining said initial position of said standard model.

11. A non-transitory computer-readable medium encoded with computer-readable instructions capable of performing a region extraction by causing a computer to execute steps comprising:

a) temporarily determining a candidate region of a to-be-extracted region from measured data with a region growing technique, wherein the candidate region is determined by expanding an area from a specified point designated by a user;

b) determining an initial position of a standard model based on said candidate region temporarily determined;

c) extracting said to-be-extracted region from said measured data with a model fitting technique using said standard model; and d) extracting a characteristic point of said candidate region temporarily determined, wherein said step b) includes the step of determining said initial position of said standard model on the basis of the degree of matching between said characteristic point of said candidate region temporarily determined and a corresponding characteristic point in said standard model and the step of determining said initial position of said standard model so as to obtain a minimum sum of distances each between the corresponding characteristic point after the determination of said initial position of said standard model and each of a plurality of corresponding characteristic points of said to-be-extracted region.

12. The non-transitory computer-readable medium according to claim 11, wherein said measured data is three-dimensional measured data, and said step a) includes the step of temporarily determining said candidate region as a three-dimensional region from said three-dimensional measured data with a three-dimensional region growing technique.

13. The non-transitory computer-readable medium according to claim 11, wherein said step a) includes the step of starting region growing with said region growing technique from a plurality of starting points.

14. The non-transitory computer-readable medium according to claim 11, wherein said step b) includes the step of aligning a position of gravity center of said standard model with a position of gravity center of said candidate region temporarily determined, thereby determining said initial position of said standard model.

15. A region extraction system comprising:

an operation unit for designating a specified point by a user;

a temporary candidate region determiner for temporarily determining a candidate region of a to-be-extracted region from measured data with a region growing technique wherein the candidate region is determined by expanding an area from the specified point;

an initial position determiner for determining an initial position of a standard model based on said candidate region temporarily determined; and a to-be-extracted region extractor for extracting said to-be-extracted region from said measured data with a model fitting technique using said standard model, wherein said initial position determiner determines said initial position of said standard model on the basis of the degree of overlap between said standard model and said candidate region temporarily determined and determines said initial position of said standard model so as to increase the value of a predetermined function defined based on a total sum of the degree of overlap in said standard model and the degree of overlap in said to-be-extracted region regarding overlapping portions of said standard model and said to-be-extracted region.

16. A computer-implemented method of extracting a to-be-extracted region from measured data, wherein the computer performs the method comprising the steps of:

a) temporarily determining a candidate region of the to-be-extracted region from measured data with a region growing technique, wherein the candidate region is determined by expanding an area from a specified point designated by a user;

b) determining an initial position of a standard model based on said candidate region temporarily determined; and c) extracting said to-be-extracted region from said measured data with a model fitting technique using said standard model, wherein said step b) includes the step of determining said initial position of said standard model on the basis of the degree of overlap between said standard model and said candidate region temporarily determined and the step of determining said initial position of said standard model so as to increase the value of a predetermined function defined based on a total sum of the degree of overlap in said standard model and the degree of overlap in said to-be-extracted region regarding overlapping portions of said standard model and said to-be-extracted region.

17. A non-transitory computer-readable medium encoded with computer-readable instructions capable of performing a region extraction by causing a computer to execute steps comprising:

a) temporarily determining a candidate region of a to-be-extracted region from measured data with a region growing technique, wherein the candidate region is determined by expanding an area from a specified point designated by a user;

b) determining an initial position of a standard model based on said candidate region temporarily determined; and c) extracting said to-be-extracted region from said measured data with a model fitting technique using said standard model;

wherein said step b) includes the step of determining said initial position of said standard model on the basis of the degree of overlap between said standard model and said candidate region temporarily determined and the step of determining said initial position of said standard model so as to increase the value of a predetermined function defined based on a total sum of the degree of overlap in said standard model and the degree of overlap in said to-be-extracted region regarding overlapping portions of said standard model and said to-be-extracted region.

* * * * *